United States Patent
Hori et al.

(10) Patent No.: US 9,925,790 B2
(45) Date of Patent: Mar. 27, 2018

(54) VALVE DRIVING DEVICE, FUNCTIONAL LIQUID SUPPLY UNIT, AND LIQUID DROPLET DISCHARGING APPARATUS

(71) Applicant: SEIKO EPSON CORPORATION, Tokyo (JP)

(72) Inventors: Kazuhito Hori, Azumino (JP); Toshio Kumagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/459,974

(22) Filed: Mar. 15, 2017

(65) Prior Publication Data

US 2017/0266979 A1     Sep. 21, 2017

(30) Foreign Application Priority Data

Mar. 18, 2016   (JP) .................................. 2016-054964

(51) Int. Cl.
*B41J 2/175*   (2006.01)
*B41J 2/165*   (2006.01)
*F16K 31/122*   (2006.01)

(52) U.S. Cl.
CPC ....... *B41J 2/17596* (2013.01); *B41J 2/16505* (2013.01); *B41J 2/16535* (2013.01); *F16K 31/122* (2013.01)

(58) Field of Classification Search
CPC .......................... B41J 2/17596; B41J 2/16505; B41J 2/16535; F16K 31/122
See application file for complete search history.

(56) References Cited

U.S. PATENT DOCUMENTS

2012/0127242 A1* 5/2012 Koike ..................... B41J 2/175
347/85

FOREIGN PATENT DOCUMENTS

JP         2012-111044         6/2012

* cited by examiner

*Primary Examiner* — Bradley Thies
(74) *Attorney, Agent, or Firm* — Workman Nydegger

(57) ABSTRACT

A valve driving device including a primary liquid chamber, a secondary liquid chamber, a valve body that opens and closes a communication flow channel through which the primary liquid chamber and the secondary liquid chamber are in communication, a pressure receiving member that partitions the secondary liquid chamber and atmospheric air in a liquid tight manner, and an operation member that opens and closes the valve body by transmitting the reaction of the pressure receiving member to the valve body, in which the pressure receiving member includes a pressure receiving plate portion that operates the operation member, and a pressure receiving film portion that is provided in the periphery of the pressure receiving plate portion, the valve driving device including a pressing driving portion that removes pressing of the pressure receiving plate portion prior to that of the pressure receiving film portion.

13 Claims, 12 Drawing Sheets

VALVE DRIVING DEVICE, FUNCTIONAL LIQUID SUPPLY UNIT, AND LIQUID DROPLET DISCHARGING APPARATUS

BACKGROUND

1. Technical Field

The present invention relates to a valve driving device that forcibly opens a self-sealing valve (a pressure adjustment valve) that is continuous with a liquid droplet discharging head, a functional liquid supply unit, and a liquid droplet discharging apparatus.

2. Related Art

In the related art, a pressing mechanism, which is incorporated in a valve unit, for adjusting the pressure of an ink to be supplied to a head is known as such a valve driving device (refer to JP-A-2012-111044).

Such a valve unit includes an accommodation chamber formation member in which an ink accommodation chamber is formed. An ink accommodation chamber is provided with a first chamber that is connected to an ink supply mechanism via a supply tube, a second chamber that is connected to a head via a connection flow channel, and a communication portion that is in communication with the first chamber and the second chamber. In addition, an opening portion is formed in the second chamber, and a flexible member is provided in the opening portion so as to block the opening portion. A pressure receiving plate is provided in the central portion of the flexible member, and the flexible member is in a state in which the flexible member is exposed at the peripheral portions of the pressure receiving plate. Furthermore, a valve is provided extending across the first chamber and the second chamber. The valve includes a flange portion having a seal, and a shaft portion, the flange portion is installed in the first chamber, and the shaft portion extends from the flange portion up to the vicinity of the flexible member of the second chamber. In addition, a biasing mechanism for adjustment, which biases toward a direction in which the valve becomes blocked, is provided in the first chamber.

When ink is discharged from the head, the second chamber reaches a negative pressure, and the flexible member deforms on the inner side due to atmospheric pressure. When the flexible member deforms, the shaft portion is pressed, the valve is opened, and ink flows into the second chamber from the first chamber. When ink flows into the second chamber and the negative pressure of the second chamber is reduced, the deformation of the flexible member is reduced, and before long the biasing force of the biasing mechanism increases and the valve is blocked. In this manner, the pressure of ink to be supplied to the head is adjusted.

The pressing mechanism includes an air bag that is installed on the outer side of the flexible member, and an air driving mechanism that is connected to the air bag. When air is supplied to the air bag from the air driving mechanism, the air bag expands and causes the flexible member to deform on the second chamber side. As a result of this, the valve is forcibly opened. On the other hand, when air is removed from the air bag, the air bag contracts, the deformation of the flexible member is canceled, and the valve is blocked by the biasing mechanism.

The opening and closing of the valve by the pressing mechanism is implemented during the implementation of so-called pressurized cleaning of the head. Pressurized cleaning of the head (nozzles) is implemented by forcibly discharging ink from the head as a result of the air bag being expanded (the air driving mechanism being driven) in synchronization with driving of a pressurization mechanism that is connected to the first chamber. In addition, pressurized cleaning is finished by contracting the air bag in synchronization with stopping of the driving the pressurization mechanism.

In such a pressing mechanism (a valve driving device) of the related art, an air bag to be contracted becomes separated from a flexible member in a process that finishes pressurized cleaning. To explain in further detail, in terms of the shape thereof, an air bag becomes separated from a flexible member of the peripheral portions of the pressure receiving plate prior to becoming separated from the pressure receiving plate, and therefore, when the air bag becomes completely separated from the pressure receiving plate, the flexible member (the peripheral portions) slightly deforms on the outer sides. That is, residual pressure is generated in the second chamber in a state in which the air bag is separated from the flexible member. In addition, it takes time to remove air from the air bag, and therefore, the blocking of the valve also takes time.

Accordingly, dripping (oozing out over time) of ink still occurs in the head after pressurized cleaning is finished (driving of a pressurization mechanism is stopped), and therefore, there is a problem in that it is not possible to transition to a subsequent wiping operation of the head (of a nozzle surface) in a short period of time. When time is required between the end of pressurized cleaning and the initiation of wiping, in a case in which the head is facing sideways such as horizontally, a gravitational force acts upon the ink that oozes out, the state of the nozzles of the head changes, and therefore, effective wiping is not possible.

SUMMARY

An advantage of some aspects of the invention is that a valve driving device that can block a valve body of a self-sealing valve that is forcibly opened while significantly reducing generation of residual pressure in a secondary liquid chamber, a functional liquid supply unit, and a liquid droplet discharging apparatus, are provided.

According to an aspect of the invention, there is provided a valve driving device that forcibly opens a valve body using an operation member by pressing a pressure receiving member from an atmospheric air side of a secondary liquid chamber in a self-sealing valve including a primary liquid chamber that includes a flow inlet for a functional liquid, the secondary liquid chamber that includes a flow outlet for the functional liquid, the valve body that opens and closes a communication flow channel through which the primary liquid chamber and the secondary liquid chamber are in communication, the pressure receiving member that is provided on a wall surface of the secondary liquid chamber, partitions the secondary liquid chamber and atmospheric air in a liquid tight manner and reacts to a difference in pressure between the pressure of the secondary liquid chamber and atmospheric pressure, and the operation member that opens and closes the valve body by transmitting the reaction of the pressure receiving member to the valve body, in which the pressure receiving member includes a pressure receiving plate portion that operates the operation member, and a pressure receiving film portion that is provided in the periphery of the pressure receiving plate portion, the valve driving device including a pressing driving portion that removes pressing of the pressure receiving plate portion prior to that of the pressure receiving film portion.

According to this configuration, using the pressing driving portion, pressing of the pressure receiving plate portion is removed prior to that of the pressure receiving film portion. That is, the pressing driving portion is separated from the pressure receiving film portion after the valve body is blocked as a result of the pressing driving portion being separated from the pressure receiving plate portion. Therefore, in a process in which the pressing driving portion is separated from the pressure receiving member, the pressure receiving film portion does not deform on the outer side of the secondary liquid chamber. Accordingly, it is possible to significantly reduce the residual pressure that is generated in the secondary liquid chamber when the valve body is blocked.

In this case, it is preferable that the pressing driving portion include a plate pressing portion that presses the pressure receiving plate portion, a film pressing portion that presses the pressure receiving film portion, an advance/retreat mechanism that presses and releases pressing by causing the plate pressing portion and the film pressing portion to advance and retreat, and a control portion that causes pressing of the pressure receiving plate portion to be released prior to that of the pressure receiving film portion by controlling the advance/retreat mechanism.

According to this configuration, as a result of controlling the advance/retreat mechanism using the control portion, it is possible to perform an operation that releases the pressing of the pressure receiving film portion after an operation that releases the pressing of the pressure receiving plate portion with high accuracy.

In this case, it is preferable that the plate pressing portion and the film pressing portion be formed in an integral manner, and that a tip end portion of the plate pressing portion and a tip end portion of the film pressing portion have a positional relationship that causes pressing of the pressure receiving plate portion to be released prior to that of the pressure receiving film portion.

According to this configuration, it is possible to set the plate pressing portion and the film pressing portion to have simple structures, and therefore, it is possible to form the overall pressing driving portion at low cost.

In addition, it is preferable that the control portion cause the plate pressing portion and the film pressing portion to advance at a low speed and retreat at a high speed.

According to this configuration, it is possible to significantly reduce the residual pressure that is generated in the secondary liquid chamber, and it is possible to block the valve body in a short period of time. Accordingly, it is possible to return the self-sealing valve to a regular state in a short period of time, and therefore, it is possible to transition to a subsequent operation or process in a short period of time.

According to another aspect of the invention, there is provided a functional liquid supply unit including the above-mentioned valve driving device, and the self-sealing valve.

According to this configuration, it is possible to use the self-sealing valve for different purposes of an adjustment mode that supplies a functional liquid to a supply target object by adjusting the pressure thereof, and a compulsory mode that supplies a large amount of the functional liquid at high pressure. Further, in the compulsory mode, since it is possible to block the valve body of the self-sealing valve, which is forcibly opened, while significantly reducing generation of residual pressure in the secondary liquid chamber, it is possible to return the self-sealing valve to the adjustment mode (a regular state) in a short period of time.

According to an aspect of the invention, there is provided a liquid droplet discharging apparatus including the above-mentioned functional liquid supply unit, a functional liquid pressurization section that is continuous with the flow inlet and pressurizes the functional liquid, and a liquid droplet discharging head that is continuous with the flow outlet.

According to this configuration, it is possible to implement pressurized cleaning of the liquid droplet discharging head by pressurizing the functional liquid using the functional liquid pressurization section and opening the valve body of the self-sealing valve using the valve driving device. In addition, it is possible to significantly suppress dripping from the liquid droplet discharging head due to residual pressure when the pressurized cleaning is finished. Additionally, the pressurized cleaning is a cleaning method of the liquid droplet discharging head that is performed in place of cleaning using suction.

In this case, it is preferable that the liquid droplet discharging apparatus further include a capping unit that receives functional liquid discharged from the liquid droplet discharging head when the valve body is forcibly opened, and a wiping unit that wipes a nozzle surface of the liquid droplet discharging head at a timing at which the valve body is blocked.

According to this configuration, using the capping unit, it is possible to receive functional liquid discharged from the liquid droplet discharging head during the pressurized cleaning. In addition, since dripping from the liquid droplet discharging head when the pressurized cleaning is finished is suppressed, it is possible to transition to a wiping operation of a nozzle surface of the liquid droplet discharging head by the wiping unit in a short period of time. Accordingly, it is possible to effectively implement maintenance of the liquid droplet discharging head in a short period of time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a valve driving device, a functional liquid supply unit, and a liquid droplet discharging apparatus according to an embodiment of the invention will be described with reference to the appended drawings. A liquid droplet discharging apparatus is a printing apparatus that performs printing on a recording medium such as paper or film using an ink jet method. In addition, an ink supply unit, which is a functional liquid supply unit, supplies an ink, which is a functional liquid, to a liquid droplet discharging head of a liquid droplet discharging apparatus, and includes a self-sealing valve (a pressure adjustment valve) that adjusts the supply pressure of the ink, and a valve driving device that forcibly opens the self-sealing valve. During printing, the self-sealing valve is operated independently, and ink is supplied to the liquid droplet discharging head at a predetermined pressure. In addition, during maintenance, the valve driving device is operated, and pressurized cleaning of the liquid droplet discharging head is implemented by forcibly opening the self-sealing valve.

Liquid Droplet Discharging Apparatus

Figure 1:
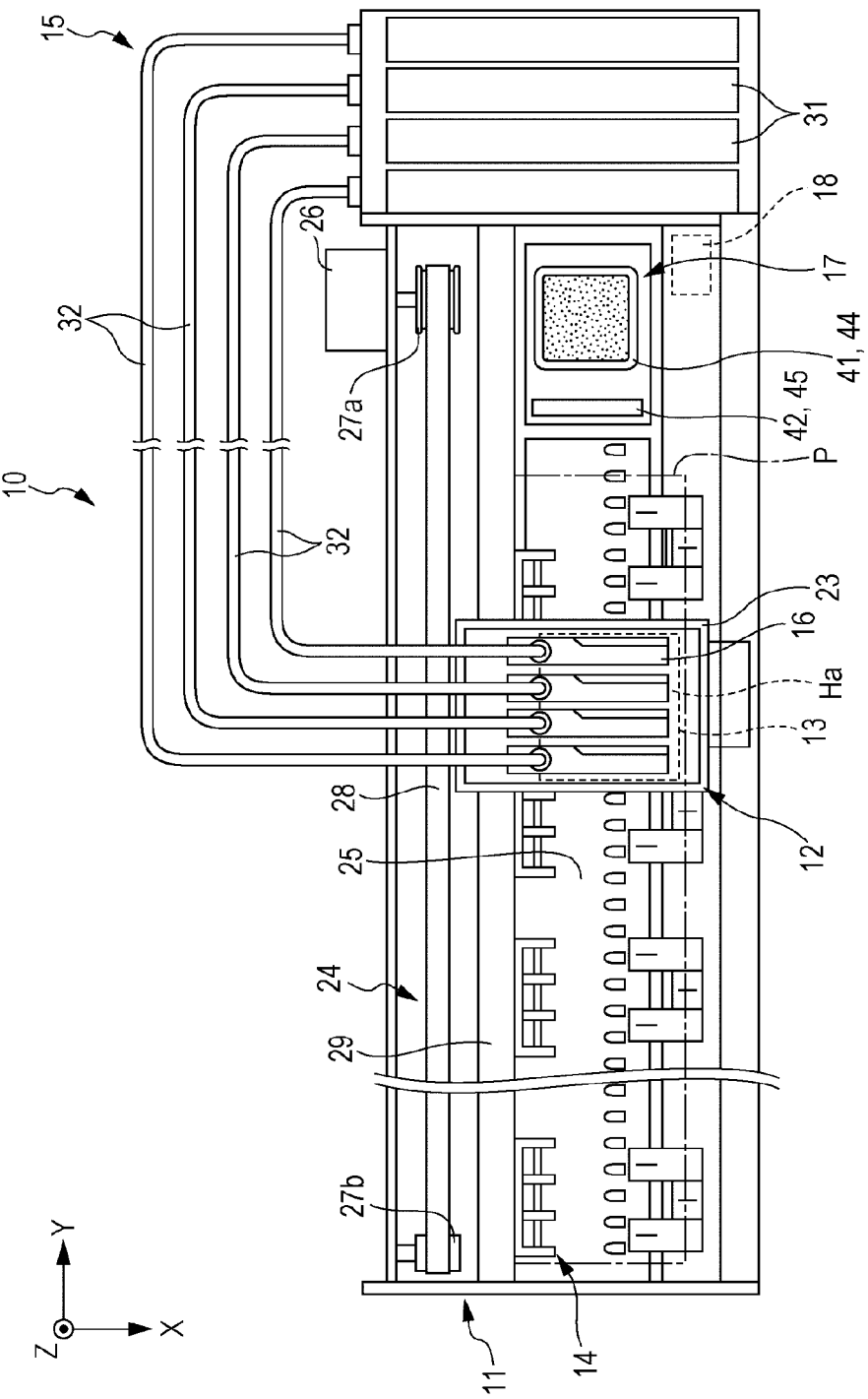
FIG. 1 is a schematic view that shows a structure of a liquid droplet discharging apparatus according to an embodiment.

FIG. 1 is a schematic view that shows a structure of a liquid droplet discharging apparatus according to an embodiment. In the manner shown in the drawing, a liquid droplet discharging apparatus 10 is provided with an apparatus frame 11, a printing section 12 that includes ink jet method liquid droplet discharging heads 13, and a medium feeding section 14 that feeds a recording medium P in such a manner as to passes through the printing section 12. In addition, the liquid droplet discharging apparatus 10 is provided with an ink supply section 15 that includes ink supply units 16 (functional liquid supply units) and supplies ink to the liquid droplet discharging heads 13, a maintenance section 17 that performs maintenance of the liquid droplet discharging heads 13, and a control section 18 that performs integrated control of these components. Hereinafter, description will be continued using an X, Y, Z Cartesian coordinate system. That is, a feeding direction of the recording medium P is set as an X axis direction, a direction that is orthogonal to the X axis direction within the plane of the recording medium P is set as a Y axis direction, and a direction that is orthogonal to the X axis direction and the Y axis direction is set as a Z axis direction.

Although not illustrated in detail, the medium feeding section 14 includes a feeding roller formed of a nipping roller, or the like, a feeding motor 21 (refer to FIG. 2) that drives the feeding roller, and a gear train. During printing, the recording medium P is fed in the X axis direction toward the lower side from the upper side in FIG. 1 by the medium feeding section 14. In this case, printing on the recording medium P is implemented by performing main scanning of the liquid droplet discharging heads 13 by using the printing section 12, and by performing sub-scanning (line feeding), which are intermittent feeds of the recording medium P, by using the medium feeding section 14.

The printing section 12 is provided with four liquid droplet discharging heads 13 that corresponds to each color of ink of Y, M, C, and B (black), a carriage 23 in which the four liquid droplet discharging heads 13 are mounted, a head movement mechanism 24 that causes the liquid droplet discharging heads 13 to reciprocate in the Y axis direction via the carriage 23, and a flat plate form platen 25 that faces the liquid droplet discharging heads 13 with a predetermined gap therebetween and forms a portion of a feeding pathway of the recording medium P.

The head movement mechanism 24 includes a carriage motor 26 that functions as a motive power source, a driving pulley 27a and a driven pulley 27b that are driven by the carriage motor 26, a timing belt 28 that is extended between the driving pulley 27a and the driven pulley 27b, and a guide rod 29 that supports the carriage 23 so as to be capable of freely sliding in the Y axis direction. The carriage 23 is fixed to a portion of the timing belt 28, and the four liquid droplet discharging heads 13 reciprocate in the Y axis direction guided by the guide rod 29 as a result of the timing belt 28 being caused to travel forward and backward via the carriage motor 26. Further, color printing is implemented as a result of the four liquid droplet discharging heads 13 being driven as appropriate in synchronization with the reciprocation (main scanning).

The ink supply section 15 is provided with four cartridge type ink tanks 31 that store each color of ink of Y, M, C, and B, four ink tubes 32 that connect the four ink tanks 31 and the four liquid droplet discharging heads 13 to each other, and four ink pumps 33 (refer to FIG. 2) that are inserted midway along each ink tube 32 and feed the ink of the ink tanks 31 to corresponding ones of the liquid droplet discharging heads 13.

In addition, although described in more detail later, the ink supply section 15 is provided with the above-mentioned ink supply units 16 that are positioned in the vicinity of each liquid droplet discharging head 13 and are inserted between the ink tubes 32, and ink pressurization sections 35 (functional liquid pressurization sections: refer to FIG. 2) that are positioned in the vicinity of each ink tank 31 and are connected to the ink tubes 32. For example, the ink pressurization sections 35 are formed of components that pressurize the ink tanks 31, pumps (diaphragm pumps) that are connected to the ink tubes 32 via a three-way valve, or the like. Further, the ink supply units 16 include self-sealing valves 36 and valve driving devices 37 that forcibly open (perform valve opening of) the self-sealing valves 36 (refer to FIG. 3).

The ink tanks 31 are provided in the apparatus frame 11, and the ink supply section 15 forms a so-called off-carriage supply system. When the ink pumps 33 are driven, the ink of the ink tanks 31 is supplied to the liquid droplet discharging heads 13 via the ink tubes 32. At this time, ink is supplied to the liquid droplet discharging heads 13 at a predetermined pressure as a result of the pressure thereof being adjusted (depressurization adjustment) by the self-sealing valves 36 of the ink supply units 16. In addition, pressurized cleaning of the liquid droplet discharging heads 13 is implemented (mentioned in more detail later) as a result of the valve driving devices 37 and the ink pressurization sections 35 being driven simultaneously.

The maintenance section 17 is installed in a home position that is separated from a printing region of the liquid droplet discharging heads 13, which reciprocate. The maintenance section 17 includes a capping unit 41 that caps nozzle surfaces 13a (refer to FIG. 3) of the liquid droplet discharging heads 13, and a wiping unit 42 that wipes the nozzle surfaces 13a of the liquid droplet discharging heads 13. The capping unit 41 includes a head cap 44, and the wiping unit 42 includes a wiper 45. A combined-use driving mechanism 46 (refer to FIG. 2) is connected to the head cap 44 and the wiper 45, and as a result of the driving mechanism 46, the head cap 44 moves between a capping position, of capping at which the head cap caps the liquid droplet discharging heads 13, and a retreat position, and the wiper 45 moves between a wiping position, at which the wiper is in contact with the liquid droplet discharging heads 13, and a retreat position.

The capping unit 41 receives ink that is discharged from the liquid droplet discharging heads 13 by the head cap 44 in pressurized cleaning of the liquid droplet discharging heads 13, which will be mentioned later, and in disposal discharge (flushing) of the liquid droplet discharging heads 13. In addition, the capping unit 41 seals the nozzle surfaces 13a of the liquid droplet discharging heads 13 using the head cap 44 when activation of the liquid droplet discharging apparatus 10 is stopped. On the other hand, the wiping unit 42 works in cooperation with the head movement mechanism 24, and wipes ink, and the like, that is attached to the nozzle surfaces 13a of the liquid droplet discharging heads 13 immediately after pressurized cleaning has been performed using the wiper 45.

Figure 2:
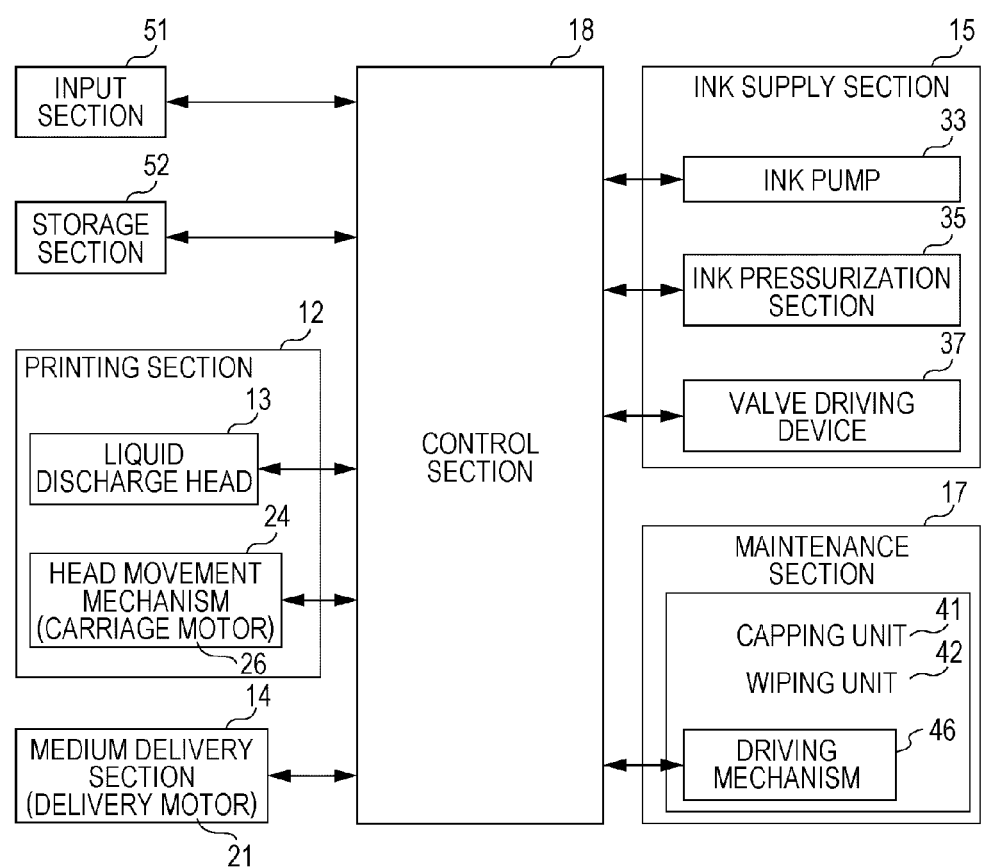
FIG. 2 is a block diagram of a control system of a liquid droplet discharging apparatus according to an embodiment.

FIG. 2 is a block diagram of a control system in the liquid droplet discharging apparatus 10. In the manner shown in the drawing, an input section 51, through which various information is input, and a storage section 52, which stores various information, are connected to the control section 18. In addition, the above-mentioned medium feeding section 14, the liquid droplet discharging heads 13 and the head movement mechanism 24 of the printing section 12, the ink supply section 15, and the maintenance section 17 are connected to the control section 18.

The control section 18 implements intermittent feeding (sub-scanning) of the recording medium P by controlling the feeding motor 21 of the medium feeding section 14. In the same manner, the control section 18 controls the carriage motor 26 of the head movement mechanism 24, and performs discharge control of the liquid droplet discharging heads 13 on the basis of printing data. In addition, the control section 18 causes the liquid droplet discharging heads 13 to face the capping unit 41 and the wiping unit 42 by controlling the carriage motor 26, and moves the head cap 44 to the capping position and the wiper 45 to the wiping position by controlling the driving mechanism 46.

Furthermore, the control section 18 implements pressurized cleaning by driving the valve driving devices 37 and the ink pressurization sections 35 of the ink supply units 16 in synchronization with one another in addition to supplying ink to the liquid droplet discharging heads 13 by driving the ink pumps 33 of the ink supply section 15. That is, the control section 18 implements control by switching the ink supply section 15 between a printing mode (an adjustment mode) that implements a normal printing operation, and a maintenance mode (a compulsory mode) that implements pressurized cleaning. Further, printing is implemented by driving the liquid droplet discharging heads 13 in the printing mode, and pressurized cleaning of the liquid droplet discharging heads 13 is implemented by driving the valve driving devices 37 and the ink pressurization sections 35 without driving the liquid droplet discharging heads 13 in the maintenance mode.

Ink Supply Unit

Here, a structure surrounding the ink supply units 16 will be described in detail with reference to FIG. 3. In the above-mentioned manner, an ink supply unit 16 is provided for each liquid droplet discharging head 13 of a different color. Each ink supply unit 16 includes a corresponding one of the self-sealing valves 36 that supplies ink to a corresponding one of the liquid droplet discharging heads 13 by adjusting the pressure thereof, and a corresponding one of the valve driving devices 37 that forcibly opens (performs valve opening of) the self-sealing valve 36. The self-sealing valve 36 is provided so that the outflow side thereof is directly coupled with the liquid droplet discharging head 13, and the valve driving device 37 is installed so as to face the self-sealing valve 36. Further, the downstream end of the ink tube 32 is connected to the inflow side of the self-sealing valve 36.

Self-Sealing Valve

Figure 3:
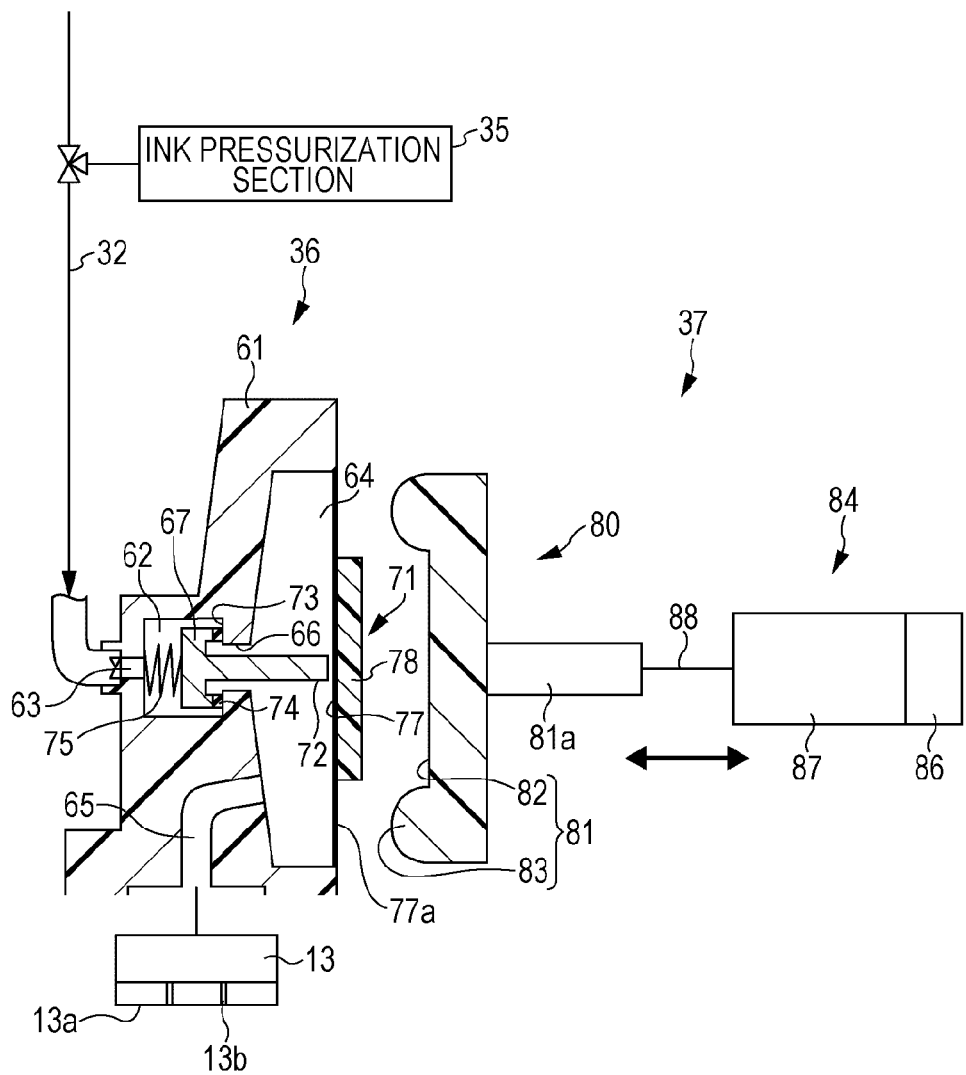
FIG. 3 is a cross-sectional structural view surrounding an ink supply unit in a liquid droplet discharging apparatus.
Figure 4A:
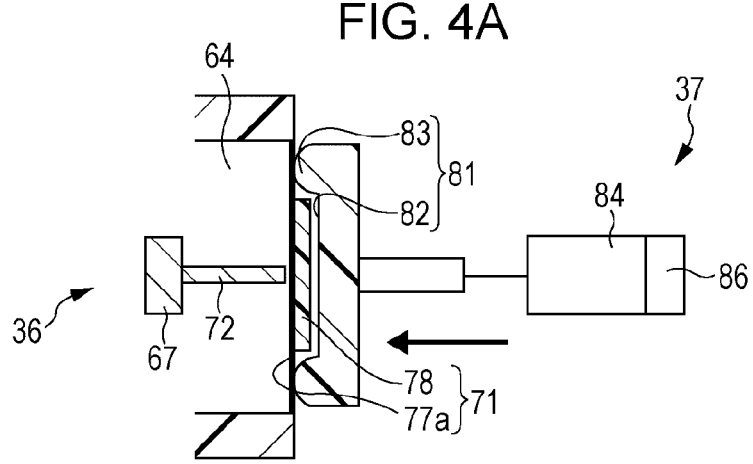
FIG. 4A is an operational explanatory view of an ink supply unit that shows a state in which a film pressing portion is in contact with a pressure receiving film portion, and a plate pressing portion is not in contact with a pressure receiving plate portion as a result of a pressing member being caused to advance.
Figure 4B:
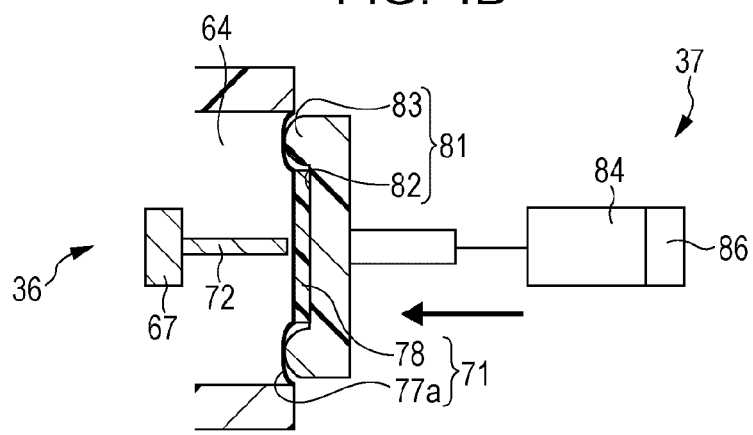
FIG. 4B is an operational explanatory view of the ink supply unit that shows a state in which the film pressing portion is in contact with the pressure receiving film portion, and the plate pressing portion is in contact with the pressure receiving plate portion as a result of the pressing member being caused to advance.
Figure 4C:
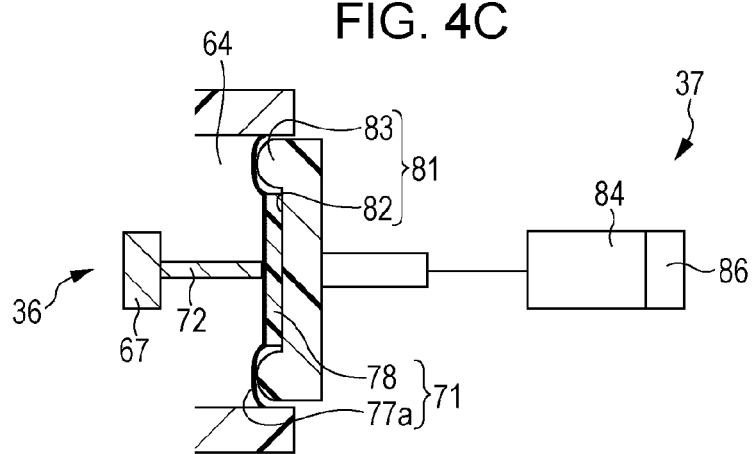
FIG. 4C is an operational explanatory view of the ink supply unit that shows a state in which the pressing member is moved to a pressing position.
Figure 4D:
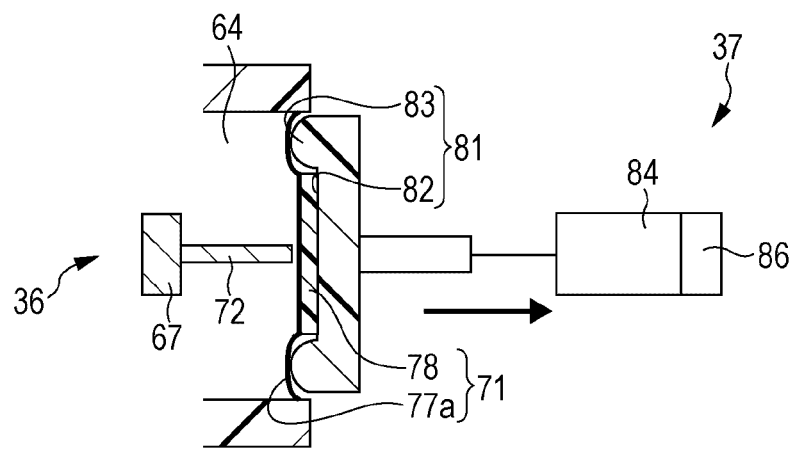
FIG. 4D is an operational explanatory view of the ink supply unit that shows a state in which the film pressing portion is in contact with the pressure receiving film portion, and the plate pressing portion is in contact with the pressure receiving plate portion as a result of the pressing member being caused to retreat.
Figure 4E:
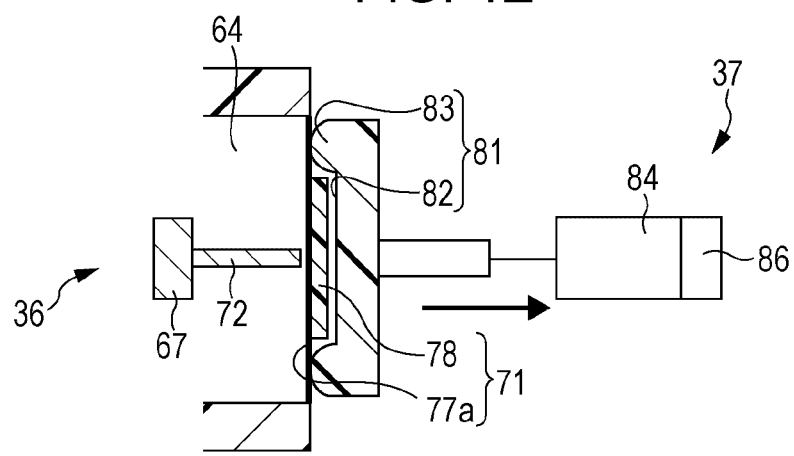
FIG. 4E is an operational explanatory view of an ink supply unit that shows a state in which the film pressing portion is in contact with the pressure receiving film portion, and the plate pressing portion is not in contact with the pressure receiving plate portion as a result of the pressing member being caused to retreat.

As shown in FIG. 3, the self-sealing valve 36 is a so-called pressure adjustment valve that adjusts the supply pressure of ink using atmospheric pressure as a reference. The self-sealing valve 36 is provided with a housing 61 made from a resin, a primary liquid chamber 62 having a flow inlet 63 defined on the inside of the housing 61, a secondary liquid chamber 64 having a flow outlet 65 defined on the inside of the housing 61, a communication flow channel 66 through which the primary liquid chamber 62 and the secondary liquid chamber 64 are in communication, and a valve body 67 that opens and closes the communication flow channel 66 from the primary liquid chamber 62 side. Further, the ink tube 32 is connected to the flow inlet 63, and the liquid droplet discharging head 13 is connected to the flow outlet 65.

In addition, the self-sealing valve 36 is provided with a pressure receiving member 71 that is provided on a wall surface (an opening portion of the housing 61) of the secondary liquid chamber 64, partitions the secondary liquid chamber 64 and atmospheric air (outside) in a liquid-tight manner and reacts to a difference in pressure between the pressure of the secondary liquid chamber 64 and atmospheric pressure, and an operation member 72 that opens and closes the valve body 67 by transmitting the reaction of the pressure receiving member 71 to the valve body 67. The valve body 67 and the operation member 72 are formed in an integral manner, and the operation member 72 extends up to the vicinity of the pressure receiving member 71 passing through the communication flow channel 66. On the other hand, a valve seating 73 is formed of an opening end portion of the communication flow channel 66, which is open to the primary liquid chamber 62, and the communication flow channel 66 opens and closed (valve opening and valve closing are performed) as a result of a seal ring 74, which is provided on the valve body 67, becoming detached from the valve seating 73.

In addition, a valve body spring 75, which weakly biases the valve body 67 toward a blocking (valve closing) direction is built into the primary liquid chamber 62, and fine adjustment of the adjustment pressure of the valve closing operation of the valve body 67 is performed as a result of the valve body spring 75 countering the reaction of the pressure receiving member 71. The pressure receiving member 71 includes a circular film body 77 that partitions the opening portion of the housing 61, and a circular pressure receiving plate portion 78 that is adhered to the outer side (a side that is opposite to the secondary liquid chamber 64) of the film body 77 in a concentric manner. The pressure receiving plate portion 78 is formed at a diameter that is sufficiently smaller than the film body 77, and when viewed from the outer portion, the pressure receiving member 71 includes the pressure receiving plate portion 78, which is positioned in the central portion, and a pressure receiving film portion 77a, which is a portion of the film body 77 that is positioned at the periphery of the pressure receiving plate portion 78.

The pressure receiving plate portion 78 is formed of a resin plate, or the like, having appropriate rigidity, and the pressure receiving film portion 77a (the film body 77) is formed of a resin film, or the like, having appropriate flexibility. Therefore, the pressure receiving member 71, which reacts to a difference in pressure between the pressure of the secondary liquid chamber 64 and atmospheric pressure, reacts in an overall manner mainly due to the reaction of the pressure receiving film portion 77a. The tip end portion of the operation member 72 faces the central portion of the pressure receiving plate portion 78 with the film body 77 interposed therebetween, the reaction of the pressure receiving member 71 is transmitted to the valve body 67 via the operation member 72, and an opening/closing operation of the valve body 67 is performed while the reaction of the pressure receiving member 71 and the biasing force of the valve body spring 75 are balanced. Additionally, the pressure receiving member 71 may be a component formed of a hard portion that is equivalent to the pressure receiving plate portion 78, and a soft portion that is equivalent to the pressure receiving film portion 77a.

In a self-sealing valve 36 that is formed in this manner, the pressure receiving member 71 becomes deformed in a concave form toward the secondary liquid chamber 64 side due to atmospheric pressure as the pressure of the secondary liquid chamber 64 falls as a result of ink discharge (mainly printing) of the liquid droplet discharging head 13. When the pressure receiving member 71 becomes deformed, the pressure receiving plate portion 78 presses the operation member 72, and the valve body 67 is opened as a result of countering the valve body spring 75. As a result of this, ink flows into the secondary liquid chamber 64 from the primary liquid chamber 62 via the communication flow channel 66. The pressure receiving member 71 becomes deformed in a convex form toward the outer side as a result of countering atmospheric pressure as the inflow of ink continues and the pressure of the secondary liquid chamber 64 rises. When the pressure receiving member 71 becomes deformed on the outer side, the valve body 67 moves to the secondary liquid chamber 64 side and blocks (valve closing is performed) the communication flow channel 66 as a result of the valve body spring 75.

In this manner, the self-sealing valve 36 opens and closes the communication flow channel 66 using atmospheric pressure as a reference, and ink is supplied to the liquid droplet discharging head 13 at a constant pressure. Therefore, ink droplets that are discharged from the liquid droplet discharging head 13 are quantitatively stabilized.

Meanwhile, in the present embodiment, pressurized cleaning of the liquid droplet discharging head 13 is implemented in the above-mentioned manner, but in such a case, ink is pressurized in advance by the ink pressurization section 35, and the self-sealing valve 36 is forcibly opened by the valve driving device 37.

Valve Driving Device

As shown in FIGS. 3 and 4A to 4E, the valve driving device 37 is installed so as to face the pressure receiving member 71 of the self-sealing valve 36, and is provided with a pressing driving portion 80 that removes the pressing of the pressure receiving plate portion 78 prior to that of the pressure receiving film portion 77a. The pressing driving portion 80 includes a pressing member 81 formed of a plate pressing portion 82, which presses the pressure receiving plate portion 78, and a film pressing portion 83, which presses the pressure receiving film portion 77a, a support portion 81a that supports the pressing member 81, and an advance/retreat mechanism 84 causes the pressing member 81 (the plate pressing portion 82 and the film pressing portion 83) to advance and retreat with respect to the pressure receiving member 71.

The plate pressing portion 82 and the film pressing portion 83 are formed in an integral manner using a resin, or the like. The film pressing portion 83 is formed in a toric form when viewed from the front surface to correspond to (face) the pressure receiving film portion 77a. The tip end portion of the film pressing portion 83 is formed in a semicircular cross-section, and this section is detached from the pressure receiving film portion 77a. In addition, the plate pressing portion 82 is formed in a circular form when viewed from the front surface to correspond to (face) the pressure receiving plate portion 78. The tip end portion of the plate pressing portion 82 is formed as a flat surface section that is surrounded by the film pressing portion 83, and this section is detached from the pressure receiving plate portion 78. That is, the plate pressing portion 82 is formed in an embedded manner in a concave form in the film pressing portion 83.

More specifically, the tip end portion (the flat surface) of the plate pressing portion 82 and the tip end portion of the film pressing portion 83 have a positional relationship in which the pressure receiving film portion 77a is pressed by the film pressing portion 83 prior to the pressure receiving plate portion 78, and the pressing of the pressure receiving plate portion 78 by the plate pressing portion 82 is released prior to the pressure receiving film portion 77a. In particular, in the positional relationship, the film pressing portion 83 is separated from the pressure receiving film portion 77a after the valve body 67 is blocked as a result of the plate pressing portion 82 being separated from the pressure receiving plate portion 78.

Although not illustrated in detail, the advance/retreat mechanism 84 is formed of a DC motor 86, and a lead screw mechanism 87 that is connected to the DC motor 86. Further, an arm 88, which extends from a female thread member of the lead screw mechanism 87, is connected to the support portion 81a of the pressing member 81. In addition, the pressing member 81 is supported so as to be capable of freely sliding along a base frame (not illustrated in the drawings) of the valve driving device 37. Further, the advance/retreat mechanism 84 causes the pressing member 81 to advance and retreat between a pressing position in which the pressure receiving member 71 is pressed, and a pressing release position that is spatially separated from the pressure receiving member 71.

As a result of the control section 18, when the DC motor 86 is rotated normally, the pressing member 81 advances via the arm 88. In the pressing member 81, which has been caused to advance, the film pressing portion 83 initially comes into contact with the pressure receiving film portion 77a (refer to FIG. 4A) and presses the pressure receiving film portion 77a. Subsequently, the plate pressing portion 82 comes into contact with the pressure receiving plate portion 78 (refer to FIG. 4B) and presses the pressure receiving plate portion 78. Furthermore, the pressing member 81 stops as a result of advancing further and reaching the pressing position (refer to FIG. 4C). In this manner, the valve body 67 of the self-sealing valve 36 is forcibly opened as a result of the pressing member 81, which has been caused to advance, pressing the pressure receiving member 71, and the pressure receiving plate portion 78 further pressing the operation member 72.

When the DC motor 86 is rotated in reverse by the control section 18 from this state, the pressing member 81 retreats via the arm 88. The pressing member 81, which has been caused to retreat, the plate pressing portion 82 initially becomes spatially separated from (releases the pressing of) the pressure receiving plate portion 78 (refer to FIG. 4D). Subsequently, the film pressing portion 83 becomes spatially separated from (releases the pressing of) the pressure receiving film portion 77a (refer to FIG. 4E). Furthermore, the pressing member 81 stops as a result of retreating further and reaching the pressing release position. As a result of this, since the pressing member 81, which has been caused to retreat, is separated from the pressure receiving member 71, the valve body 67 is closed by the biasing force of the valve body spring 75. In this case, the film pressing portion 83 becomes separated from the pressure receiving film portion 77a at a timing at which the valve body 67 is blocked as a result of the plate pressing portion 82 being separated from the pressure receiving plate portion 78.

In addition, the control section 18 rotates the DC motor 86 normally at low speed, and rotates the DC motor 86 in reverse at high speed in comparison with normal rotation. That is, the control section 18 causes the pressing member 81 to advance at low speed, and causes the pressing member 81 to retreat at high speed. As a result of this, a valve opening operation of the self-sealing valve 36 is performed slowly, and valve closing is performed rapidly. Additionally, since a blocking operation of the valve body 67 is in the same direction as the flow direction of ink, a pulsing motion of ink is not caused on the ink tube 32 side.

Figure 5:
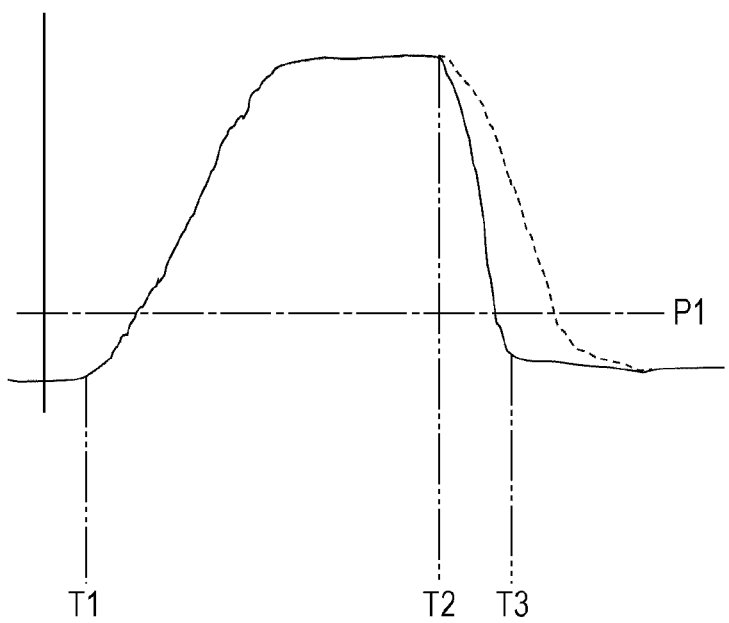
FIG. 5 is an explanatory view that shows changes in pressure of a secondary liquid chamber of a self-sealing valve when a valve driving device is driven.

FIG. 5 shows changes in pressure of the secondary liquid chamber 64 of the self-sealing valve 36 when the valve driving device 37 is driven. In the manner shown in the drawing, the pressure of the secondary liquid chamber 64 begins to rise from a state (T1: refer to FIG. 4A) in which the film pressing portion 83 comes into contact with the pressure receiving film portion 77a. Subsequently, the plate pressing portion 82 comes into contact with the pressure receiving plate portion 78 and the valve body 67 is opened. In this instance, the pressure of the ink pressurization section 35 acts on the secondary liquid chamber 64, and the pressure of the secondary liquid chamber 64 reaches a constant pressure. In addition, the pressing member 81 reaches the pressing position (refer to FIG. 4C). A predetermined amount of time elapses (the pressurized cleaning) in this state, the valve body 67 closes in tandem with the plate pressing portion 82 becoming separated from the pressure receiving plate portion 78 as a result of retreat of the pressing member 81 being initiated (T2: refer to FIG. 4D), and the pressure of the secondary liquid chamber 64 begins to fall rapidly. Further, the secondary liquid chamber 64 reverts to a substantially original pressure at a point at which the film pressing portion 83 becomes separated from the pressure receiving film portion 77a (T3: refer to FIG. 4E).

The virtual line (the dotted line) in FIG. 5 is the above-mentioned case of the related art that uses an air bag, and as shown by the dotted line, it takes time for the pressure of the secondary liquid chamber 64 to revert to the original pressure. In addition, the dashed-dotted line in FIG. 5 is a guide pressure (P1) at which dripping does not occur in the liquid droplet discharging head 13 as a result of the pressure of the secondary liquid chamber 64 falling to this pressure. That is, it is possible to transition to wiping as long as the pressure of the secondary liquid chamber 64 falls to the position of P1.

Additionally, the plate pressing portion 82 and the film pressing portion 83 may be separate bodies. In such a case, it is preferable that a structure in which the film pressing portion 83 is set to be capable of sliding with respect to the plate pressing portion 82, and the film pressing portion 83 is biased toward the plate pressing portion 82 in an advancing direction by a spring, or the like, be used. Naturally, a structure in which the plate pressing portion 82 and the film pressing portion 83 are set as separate bodies, and an advance/retreat mechanism 84 is respectively provided, may also be used. In addition, the advance/retreat mechanism 84 may also be formed of a solenoid or a double-acting cylinder. Furthermore, the advance/retreat mechanism 84 may be a component in which a link mechanism is provided in place of the lead screw mechanism 87.

Maintenance Operations

In this instance, a series of maintenance operations that include the pressurized cleaning of the liquid droplet discharging heads 13 by the control section 18 will be described with reference to FIGS. 6A to 6F. When transition to the maintenance mode from the printing mode occurs, the control section 18 moves the liquid droplet discharging heads 13 to the home position by driving the head movement mechanism 24, and brings the head cap 44 close to the nozzle surfaces 13a of the liquid droplet discharging heads 13 by driving the driving mechanism 46 (refer to FIG. 6A). Next, the control section 18 pressurizes the ink inside the ink tubes 32 by driving the ink pressurization section 35, and drives the valve driving device 37 to rotate normally (the DC motor 86 rotates normally).

When the valve driving device 37 is driven to rotate normally, the self-sealing valve 36 opens, and ink is powerfully fed to liquid droplet discharging heads 13. As a result of this, ink is powerfully discharged from nozzles 13b of the liquid droplet discharging heads 13, and, in addition, the discharged ink is received by the head cap 44 (refer to FIG. 6B). In this manner, air bubbles, and the like, that follow the flow of the ink are eliminated from the nozzles 13b of the liquid droplet discharging heads 13, and the liquid droplet discharging head 13 is cleaned. When the ink discharge (cleaning), which lasts for a predetermined amount of time, finishes, the control section 18 stops the driving of the ink pressurization section 35, and drives the valve driving device 37 to rotate in reverse (the DC motor 86 is rotated in reverse) to match a timing at which the secondary liquid chamber 64 returns to atmospheric pressure. When the valve driving device 37 is driven to rotate in reverse, the self-sealing valve 36 closes (refer to FIGS. 6C and 6D).

Figure 6A:
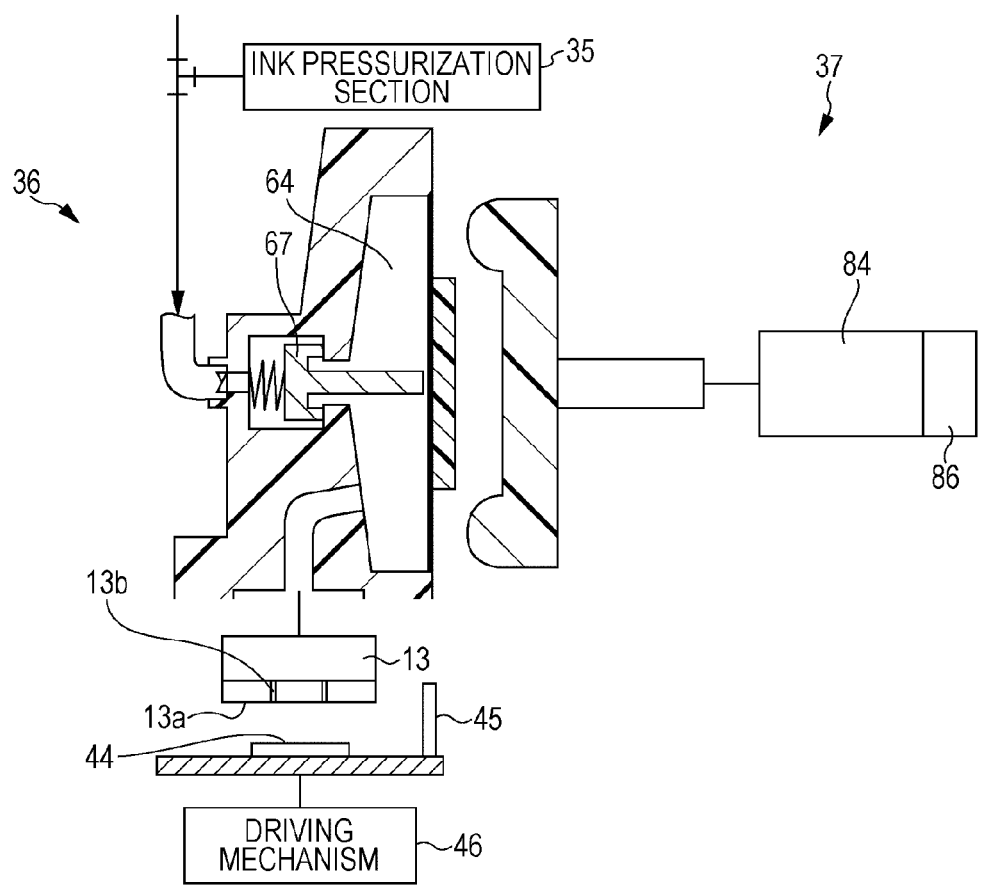
FIG. 6A is an operational explanatory view that shows an initial operation during maintenance.
Figure 6B:
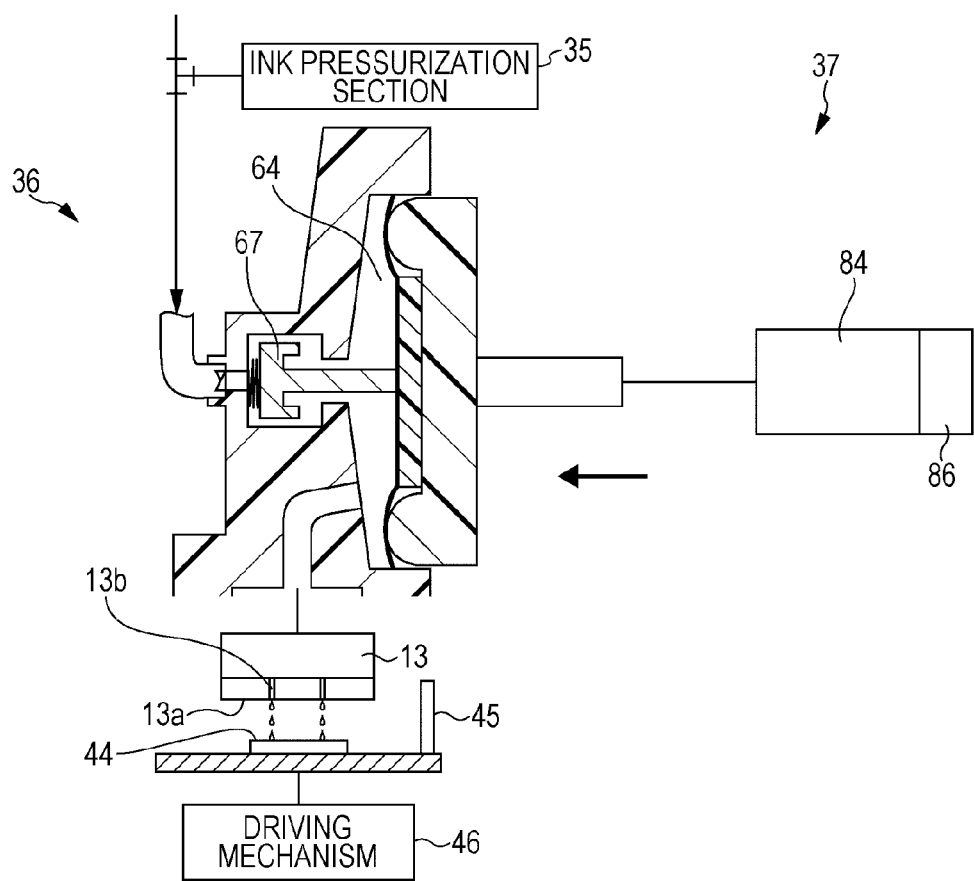
FIG. 6B is an operational explanatory view that shows a valve opening operation of the self-sealing valve during maintenance.
Figure 6C:
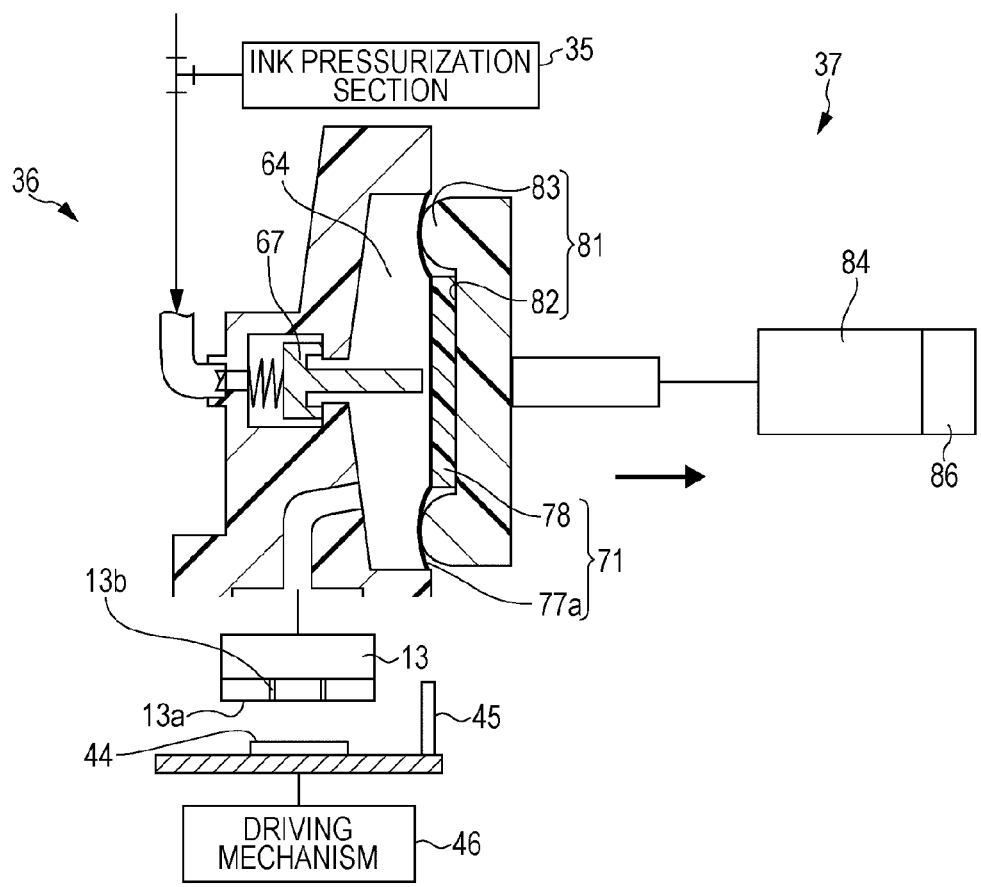
FIG. 6C is an operational explanatory view that shows a valve opening operation (the release of pressing of the pressure receiving plate portion) of the self-sealing valve during maintenance.
Figure 6D:
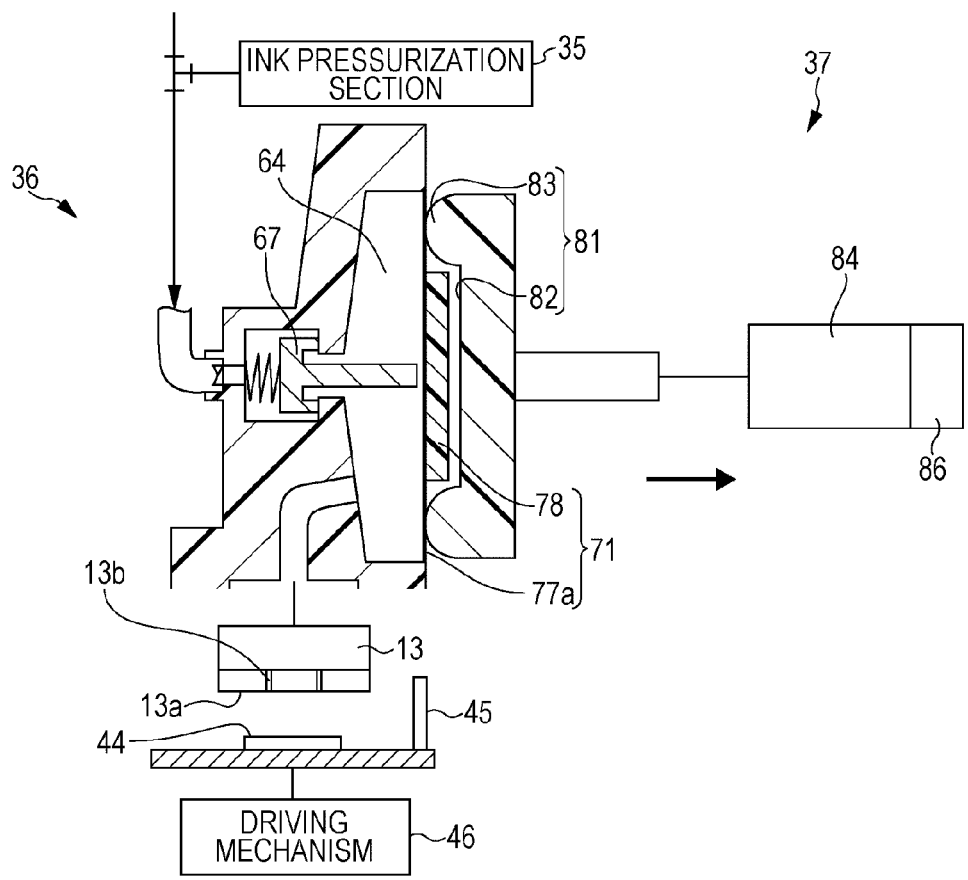
FIG. 6D is an operational explanatory view that shows a valve opening operation (the release of pressing of the pressure receiving film portion) of the self-sealing valve during maintenance.
Figure 6E:
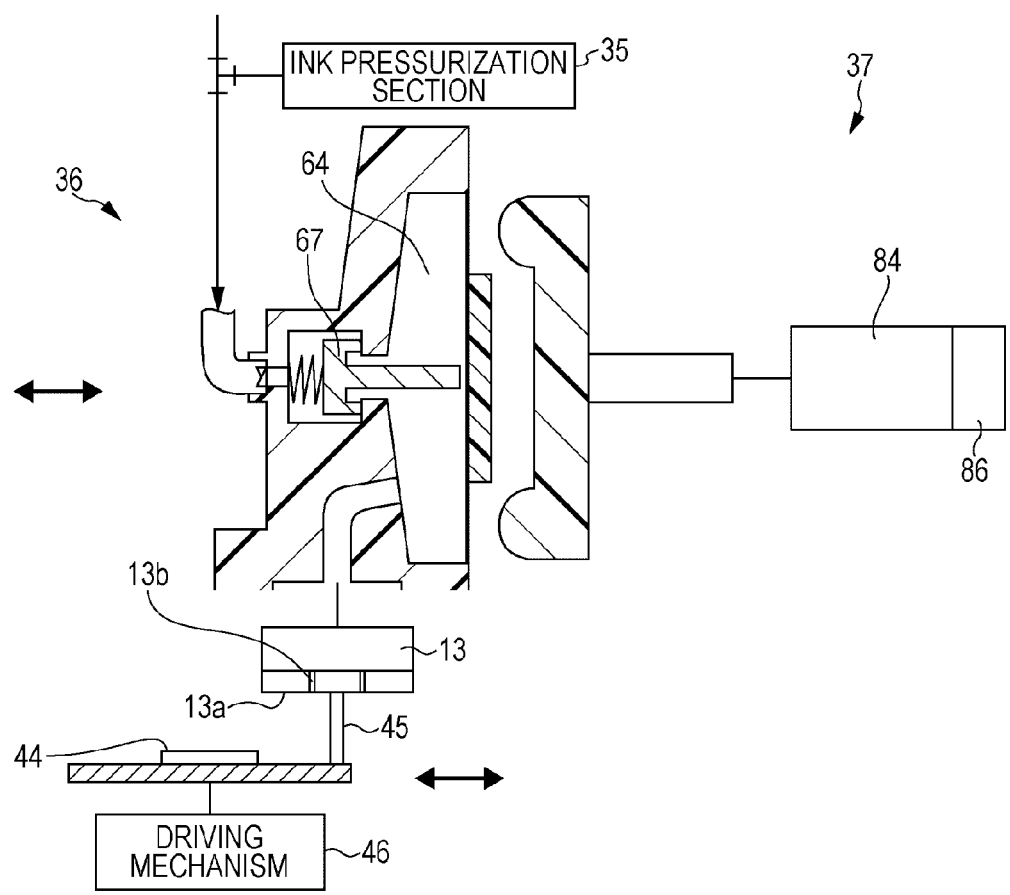
FIG. 6E is an operational explanatory view that shows a wiping operation during maintenance.
Figure 6F:
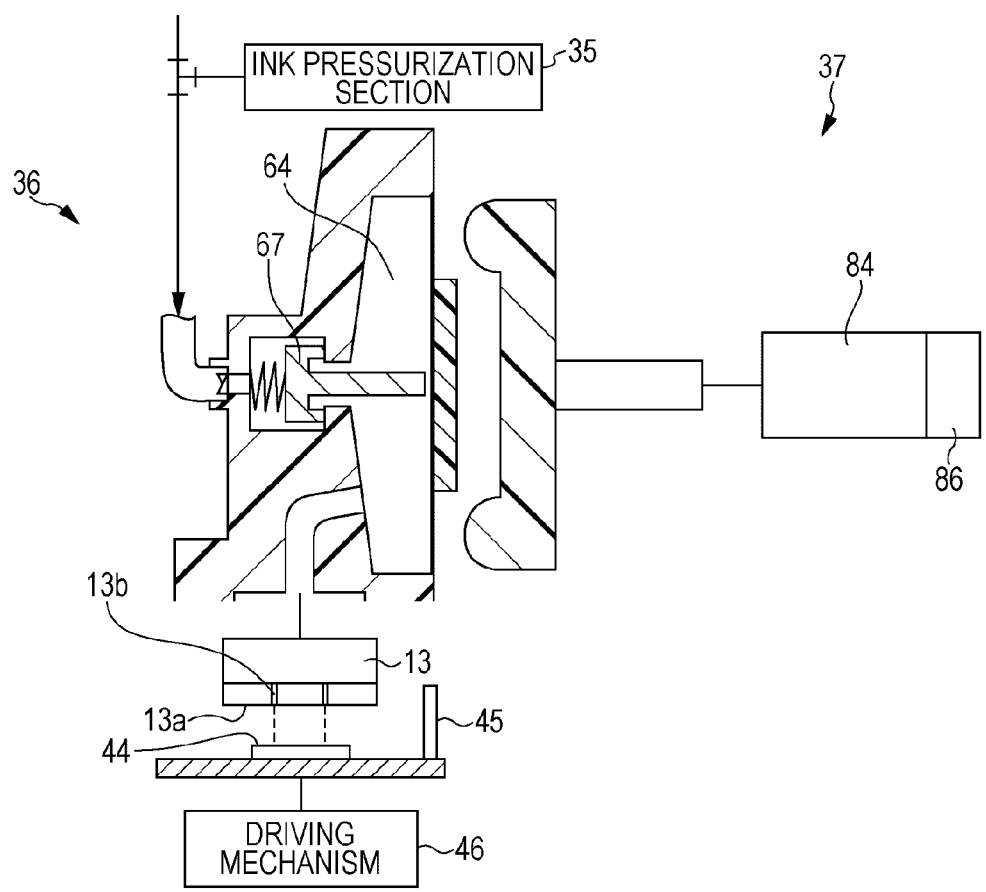
FIG. 6F is an operational explanatory view that shows a flushing operation during maintenance.

In the valve closing operation of the self-sealing valve 36, the pressing member 81 is separated from the pressure receiving member 71 (release of pressing), but at this time, the film pressing portion 83 is separated from the pressure receiving film portion 77a (refer to FIG. 6D) after the plate pressing portion 82 has been separated from the pressure receiving plate portion 78 (refer to FIG. 6C). Therefore, the secondary liquid chamber 64 reaches the same pressure as atmospheric pressure following the release of pressing of the pressing member 81 without a residual pressure being generated in the secondary liquid chamber 64. Accordingly, the pressing member 81 moves to the pressing release position, and dripping (oozing out) does not occur in the liquid droplet discharging heads 13 when a series of the pressurization cleaning operations are finished.

In such an instance, once the pressurization cleaning operation is finished, transition to the wiping operation can be performed without taking time. In the wiping, the control section 18 moves the wiper 45 to the wiping position by driving the driving mechanism 46, and subsequently causes the wiper 45 to reciprocate briefly in the center of the liquid droplet discharging head 13 by driving the head movement mechanism 24 (refer to FIG. 6E). As a result of this, the nozzle surfaces 13a of the liquid droplet discharging heads 13 are relatively wiped by the wiper 45. Lastly, disposal discharge (flushing) toward the head cap 44 is performed by driving the liquid droplet discharging heads 13 (refer to FIG. 6F). Maintenance of the liquid droplet discharging heads 13 is performed by the control section 18 in this manner.

Functions and Effects

In the above-mentioned manner, according to the present embodiment, when the pressing of the pressing member 81 with respect to the pressure receiving member 71 is released, the film pressing portion 83 becomes separated from the pressure receiving film portion 77a after the plate pressing portion 82 becomes separated from the pressure receiving plate portion 78. That is, the film pressing portion 83 becomes separated from the pressure receiving film portion 77a after the valve body 67 is blocked as a result of the plate pressing portion 82 becoming separated from the pressure receiving plate portion 78. Therefore, in a process in which the pressing member 81 is separated from the pressure receiving member 71, the pressure receiving film portion 77a does not deform toward the outer side of the secondary liquid chamber 64. Accordingly, when the valve body 67 is blocked, it is possible to effectively prevent dripping from the liquid droplet discharging heads 13, which is generated immediately after the self-sealing valve 36 is closed, without a residual pressure be generated in the secondary liquid chamber 64.

This is also possible when transitioning to the wiping operation immediately after valve closing of the self-sealing valve 36. That is, it is possible to perform transition to the wiping operation in a short period of time after the finish of pressurized cleaning. As a result of this, it is possible to implement wiping before a state such as air bubbles being in the nozzles 13b, changes, and therefore, it is possible to effectively implement maintenance of the liquid droplet discharging heads 13 in a short period of time.

In addition, the plate pressing portion 82 and the film pressing portion 83 are caused to advance at low speed, and caused to retreat at high speed. As a result of this, it is possible to block the valve body 67 in a short period of time, and therefore, for this reason also, it is possible to implement maintenance of the liquid droplet discharging heads 13 in a short period of time.

This application claims priority under 35 U.S.C. §119 to Japanese Patent Application No. 2016-054964, filed Mar. 18, 2016. The entire disclosure of Japanese Patent Application No. 2016-054964 is hereby incorporated herein by reference.

What is claimed is:

1. A valve driving device that forcibly opens a valve body using an operation member by pressing a pressure receiving member from an atmospheric air side of a secondary liquid chamber in a self-sealing valve including
   a primary liquid chamber that includes a flow inlet for a functional liquid,
   the secondary liquid chamber that includes a flow outlet for the functional liquid,
   the valve body that opens and closes a communication flow channel through which the primary liquid chamber and the secondary liquid chamber are in communication,
   the pressure receiving member that is provided on a wall surface of the secondary liquid chamber, partitions the secondary liquid chamber and atmospheric air in a liquid tight manner and reacts to a difference in pressure between the pressure of the secondary liquid chamber and atmospheric pressure, and
   the operation member that opens and closes the valve body by transmitting the reaction of the pressure receiving member to the valve body,
   in which the pressure receiving member includes a pressure receiving plate portion that operates the operation member, and a pressure receiving film portion that is provided in the periphery of the pressure receiving plate portion,
   the valve driving device comprising a pressing driving portion that removes pressing of the pressure receiving plate portion prior to that of the pressure receiving film portion.

2. The valve driving device according to claim 1,
   wherein the pressing driving portion includes
   a plate pressing portion that presses the pressure receiving plate portion,
   a film pressing portion that presses the pressure receiving film portion,
   an advance/retreat mechanism that presses and releases pressing by causing the plate pressing portion and the film pressing portion to advance and retreat, and
   a control portion that causes pressing of the pressure receiving plate portion to be released prior to that of the pressure receiving film portion by controlling the advance/retreat mechanism.

3. The valve driving device according to claim 2,
   wherein the plate pressing portion and the film pressing portion are formed in an integral manner, and
   wherein a tip end portion of the plate pressing portion and a tip end portion of the film pressing portion have a positional relationship that causes pressing of the pressure receiving plate portion to be released prior to that of the pressure receiving film portion.

4. A functional liquid supply unit comprising:
   the valve driving device according to claim 3; and
   the self-sealing valve.

5. A liquid droplet discharging apparatus comprising:
the functional liquid supply unit according to claim 4;
a functional liquid pressurization section that is continuous with the flow inlet and pressurizes the functional liquid; and
a liquid droplet discharging head that is continuous with the flow outlet.

6. The valve driving device according to claim 2, wherein the control portion causes the plate pressing portion and the film pressing portion to advance at a low speed and retreat at a high speed.

7. A functional liquid supply unit comprising:
the valve driving device according to claim 6; and
the self-sealing valve.

8. A liquid droplet discharging apparatus comprising:
the functional liquid supply unit according to claim 7;
a functional liquid pressurization section that is continuous with the flow inlet and pressurizes the functional liquid; and
a liquid droplet discharging head that is continuous with the flow outlet.

9. A functional liquid supply unit comprising:
the valve driving device according to claim 2; and
the self-sealing valve.

10. A liquid droplet discharging apparatus comprising:
the functional liquid supply unit according to claim 9;
a functional liquid pressurization section that is continuous with the flow inlet and pressurizes the functional liquid; and
a liquid droplet discharging head that is continuous with the flow outlet.

11. A functional liquid supply unit comprising:
the valve driving device according to claim 1; and
the self-sealing valve.

12. A liquid droplet discharging apparatus comprising:
the functional liquid supply unit according to claim 11;
a functional liquid pressurization section that is continuous with the flow inlet and pressurizes the functional liquid; and
a liquid droplet discharging head that is continuous with the flow outlet.

13. The liquid droplet discharging apparatus according to claim 12, further comprising:
a capping unit that receives the functional liquid discharged from the liquid droplet discharging head when the valve body is forcibly opened; and
a wiping unit that wipes a nozzle surface of the liquid droplet discharging head at a timing at which the valve body is blocked.

* * * * *